(12) United States Patent
Reymann

(10) Patent No.: US 6,793,968 B1
(45) Date of Patent: Sep. 21, 2004

(54) METHOD AND DEVICE FOR COATING A PRODUCT

(75) Inventor: Helge Reymann, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/914,839

(22) PCT Filed: Feb. 17, 2000

(86) PCT No.: PCT/EP00/01301
§ 371 (c)(1),
(2), (4) Date: Sep. 4, 2001

(87) PCT Pub. No.: WO00/52220
PCT Pub. Date: Sep. 8, 2000

(30) Foreign Application Priority Data

Mar. 4, 1999 (EP) ............................................. 99104404

(51) Int. Cl.$^7$ .............................................. C23C 16/06
(52) U.S. Cl. .................... 427/250; 427/252; 427/376.1; 118/719; 118/729
(58) Field of Search ................................ 427/250, 252, 427/376.1; 118/719, 729

(56) References Cited

U.S. PATENT DOCUMENTS

| | | | |
|---|---|---|---|
| 3,615,881 A | | 10/1971 | Greene |
| 3,649,225 A | | 3/1972 | Simmons |
| 4,178,986 A | * | 12/1979 | Smashey .................. 164/513 |
| 4,627,896 A | * | 12/1986 | Nazmy et al. ............. 204/37.1 |
| 4,680,199 A | * | 7/1987 | Vontell et al. ............. 427/199 |
| 4,933,239 A | * | 6/1990 | Olson et al. ............... 428/557 |
| 4,962,005 A | * | 10/1990 | Alperine et al. ........... 428/670 |
| 5,238,752 A | | 8/1993 | Duderstadt |
| 5,482,578 A | * | 1/1996 | Rose et al. ................. 148/516 |
| 5,545,484 A | * | 8/1996 | Yamaguchi et al. ....... 428/408 |
| 5,741,556 A | * | 4/1998 | Taylor et al. .............. 427/453 |
| 5,817,372 A | * | 10/1998 | Zheng ....................... 427/456 |
| 5,824,205 A | * | 10/1998 | Foster ....................... 205/109 |
| 5,876,860 A | * | 3/1999 | Marijnissen et al. ...... 428/623 |
| 5,993,980 A | * | 11/1999 | Schmitz et al. ........... 428/633 |
| 6,042,878 A | * | 3/2000 | Bruce ..................... 427/126.2 |
| 6,228,513 B1 | * | 5/2001 | Jaslier et al. .............. 428/639 |
| 6,306,515 B1 | * | 10/2001 | Goedjen et al. ........... 428/469 |

FOREIGN PATENT DOCUMENTS

| | | |
|---|---|---|
| DE | 43 21 135 | 6/1993 |
| EP | 0 477 990 | 4/1992 |
| JP | 07268605 | 3/1994 |

* cited by examiner

Primary Examiner—Bret Chen
(74) Attorney, Agent, or Firm—Harness, Dickey & Pierce, P.L.C.

(57) ABSTRACT

A method includes coating a product with a metallic coating, in particular a high-temperature component product of a gas turbine, in a vacuum plant. An apparatus coats the product with a metallic coating in a vacuum plant, having a coating chamber and a postheat treatment chamber. Novel process control with regard to a temperature profile, in particular after the application of the metallic coating to the product and before the postheat treatment, involves the ensuring of a minimum temperature at all times, this minimum temperature being relatively higher than room temperature.

38 Claims, 2 Drawing Sheets

METHOD AND DEVICE FOR COATING A PRODUCT

This application is the national phase under 35 U.S.C. §371 of PCT International Application No. PCT/EP00/01301 which has an International filing date of Feb. 17, 2000, which designated the United States of America, the entire contents of which are hereby incorporated by reference.

FIELD OF THE INVENTION

The invention relates to a method of coating a product with a metallic coating, in particular with a metallic anti-oxidation coating, in a vacuum plant. In the method, the product is fed into the vacuum plant and heated from room temperature to a product temperature, the metallic coating is applied to the product, and the coated product is subjected to a postheat treatment. Furthermore, the invention relates to an apparatus for coating a product with a metallic coating in a vacuum plant, the vacuum plant including a coating chamber and a postheat treatment chamber.

BACKGROUND OF THE INVENTION

Coating plants for coating gas turbine blades are known, e.g. an inline EB-PVD coating plant from Interturbine Von Ardenne GmbH (EB-PVD: Electron Beam—Physical Vapor Deposition), in which a ceramic coating is applied to the gas turbine blade by means of physical vaporization processes. Such a coating plant, for example, may be composed of chambers arranged directly one behind the other and connected to a transfer system for conveying the turbine blades. In this case, the first chamber serves as a loading chamber for turbine blades. From the loading chamber, the turbine blades are transported into a second vacuum chamber connected to the loading chamber and are preheated there. Further transport into a process chamber then takes place, in which process chamber a ceramic material, in particular an yttrium-stabilized zirconium oxide, is heated, melted and vaporized by means of electron beam vaporization. The ceramic material condenses on the turbine blades and therefore forms the ceramic coating. The turbine blades thus coated are transported further into a cooling chamber and cooled therein. The cooling is effected without monitoring, in particular in an uncontrolled manner, since the turbine blades are left on their own in the cooling chamber and consequently emit their heat to the surroundings via heat radiation until they have cooled down to room temperature.

U.S. Pat. No. 5,238,752 discloses a heat-insulating-coating system which is applied to a turbine blade. In this case, the parent material of the turbine blade consists of a nickel-base superalloy to which a metallic protective or bonding coating of the type MCrAlY or PtAl is applied. Here, M stands for nickel and/or cobalt, Cr stands for chromium, Al stands for aluminum, Y stands for yttrium and Pt stands for platinum. Forming on this metallic bonding coating is a thin coating of aluminum oxide, to which the actual ceramic heat-insulating coating of zirconium oxide stabilized with yttrium is applied. In this case, the turbine blade is coated by means of a physical vaporization process in which the ceramic material (zirconium oxide) is vaporized by being bombarded with electron beams. This coating process is effected in a vacuum chamber, the turbine blade being heated via a substrate heater by means of heat radiation to a temperature of about 1200 K to 1400 K, in particular about 1300 K.

Those coatings on turbine blades which are produced in the above-described, known methods and apparatuses are still capable of improvement with regard to their service life, in particular in the case of hot-gas admission when used in a gas turbine.

SUMMARY OF THE INVENTION

The object of the invention is to provide a method of coating a product with a metallic coating. In this case, the fatigue strength of the metallic coating, in particular against corrosive and oxidizing attacks, is to be markedly improved. A further object of the invention is to specify an apparatus for coating a product with a metallic coating. The production of a metallic coating of high quality on the product is to be possible with the apparatus.

According to the invention, the first-mentioned object is achieved by a method of coating a product with a metallic coating, in particular with a metallic anti-oxidation coating, in a vacuum plant. In this method, the product is fed into the vacuum plant and heated from room temperature to a product temperature; the metallic coating is applied to the product; and the coated product is subjected to a postheat treatment. The postheat treatment follows the application of the coating in such a way that the temperature of the product after the application of the coating and before the postheat treatment is at least as high as a minimum temperature, the minimum temperature being relatively higher than room temperature.

In this case, the invention is based on the idea that the quality of a primary metallic coating applied to the parent material of a product is especially important. Material properties and characteristic coating properties, such as the homogeneity of the coating, the bonding to the substrate, and the structure of the boundary layer between coating and substrate for example, are important quality features. These also have an effect on the bonding and condition of further coatings which are applied to the primary coating possibly in further coating processes.

A metallic coating on a product, for example a metallic anti-oxidation coating, will therefore develop its function more effectively, for instance as a protective coating against corrosion and/or oxidation, the better the abovementioned coating properties are realized. For the service life of metallic coatings on products which appear under oxidizing or corrosive conditions, for example, in addition to the selection of the materials, in particular the bonding of the coating to the parent material of the product is decisive. This depends on the treatment of the product in all the phases of the production process. In this case, chemical and physical—in particular thermal—influences which may possibly impair the forming and bonding of the coating are to be taken into account.

Chemical influences can be largely reduced by the selection of suitable materials for all the built-in components of the equipment, which as far as possible are to be chemically inert with respect to the coating materials. Physical conditions under which the process for producing a coating takes place relate to the process control in its entirety, that is to say from the preparation of the product, via the application of the protective coating up to the further treatment of the product, normally a subsequent postheat treatment—and all possible intermediate steps.

The monitoring and configuration of the process control in all the phases of the production process is therefore very important. In this case, time-dependent and locus-dependent thermodynamic process parameters, such as pressure and temperature, to which the product is subjected in the production process are to be taken into account. For example, on account of the generally different coefficients of thermal expansion of parent material and coating material, the product temperature during the application of the coating (coating temperature) and the temperature profile up to completion of a postheat treatment of the coated product have a considerable effect on the formation of the boundary layer between product surface and coating.

Virtually steady process control with regard to the temperature in all the phases of the process for producing the metallic coating can be achieved with the method. In this case, after the application of the metallic coating to the product and before the postheat treatment, a minimum temperature of the product is ensured at all times, this minimum temperature being higher than room temperature.

In the case of products which constitute high-temperature components of gas turbines, for instance in the case of gas turbine blades or heat shield elements of combustion chambers, this minimum temperature is preferably about 500 K, in particular about 900 K to 1400 K.

The method operates on a product that is always close to a state of thermodynamic equilibrium with its surroundings. Time-dependent and spatial temperature gradients, in particular thermal shocks, are avoided. By this novel method in the process control with regard to the temperature profile, it is possible to markedly improve the bonding of the metallic coating to the parent material of the product in the postheat treatment. In the postheat treatment following the application of the metallic coating in this manner, a firm connection between parent material and coating material is produced by diffusion actions, and a coating of high quality is formed on the product.

The application of the metallic coating to the product is preferably effected in a coating region and the postheat treatment is preferably effected in a postheat treatment region. In this case, the coating region and the postheat treatment region are different regions of the vacuum plant. It is advantageous to carry out the application of the metallic coating to the product and the postheat treatment in the same vacuum plant but spatially separate from one another, since these process steps are carried out at somewhat different temperatures and generally have different process times. For example, the application of a metallic coating to a gas turbine blade, in particular a metallic anti-oxidation and anti-corrosion coating, is carried out at a coating temperature of about 1100 K to 1200 K, whereas the postheat treatment of the gas turbine blade is effected at a postheat treatment temperature of about 1200 K to 1500 K. The separation of coating region and postheat treatment region has a favorable effect on the quality and reproducibility of the metallic coatings. A situation in which different process steps having different process parameters are carried out in the same region of a plant is avoided. This could be effected virtually only with a periodic change of the operating parameters of the vacuum plant, a factor which impairs the quality and reproducibility of the coatings.

The coated product is preferably transferred automatically from the coating region into the postheat treatment region. This procedure is very advantageous with regard to industrial production of the metallic coating. In particular in a vacuum plant, automatic, preferably electronically controlled, transfer of the products is far superior to other known embodiments, for example with complicated manipulators manually operable externally and with sealed vacuum leadthroughs.

The product subjected to postheat treatment is preferably cooled down to room temperature in a controlled manner. The cooling to room temperature is also preferably carried out in a controlled or regulated manner. This is effected just prior to possible removal of the product from the vacuum plant. Monitoring and control of the cooling operation avoids a situation in which, after completion of the postheat treatment, the product is cooled down in an uncontrolled manner to room temperature, a factor which could have an adverse effect on the coating properties on account of the thermal stresses which then occur between the metallic coating and the substrate.

A first number of products is preferably located in the coating region and simultaneously a second number of products is preferably located in the postheat treatment region, the second number being larger than the first number. This procedure is very advantageous with regard to industrial series production of metallic coatings on products. The metallic coating is applied to products in the coating region, while at the same time products are subjected to a postheat treatment in the postheat treatment region. This provides for efficient production of metallic coatings on products. A continuous and simultaneous pass of products through the method steps is possible.

In particular, in this continuous method, the pass of products per unit of time is markedly increased compared with non-simultaneous method steps. In the method, due to the different process times of the individual method steps, more products are subjected to a postheat treatment than are located at the same time in the coating region, since the postheat treatment process generally constitutes the limiting process with respect to time. For example, the application of a metallic coating to a gas turbine blade, in particular the application of a metallic anti-oxidation and anti-corrosion coating, has a process time of about 30 min, whereas the postheat treatment of the gas turbine blade, at about 60 min to 240 min, lasts considerably longer. By designing the vacuum plant with due regard to the respective process times, a continuous and simultaneous pass of products is ensured, and efficient production is made possible.

The product used is preferably a high-temperature component of a gas turbine, in particular a gas turbine blade or a heat shield element of a combustion chamber. Furthermore, the parent material used for the high-temperature component is preferably a nickel- or iron- or cobalt-base superalloy. A gas turbine blade is a high-temperature component which is arranged in the hot-gas duct of a gas turbine. A distinction is made between turbine guide blades and turbine moving blades, which are exposed to high thermal loads, in particular in gas turbines having high turbine inlet temperatures of over 1500 K for example, and to corrosive and oxidizing conditions due to the hot gas. Therefore an appropriate alloy has to be selected for the parent material. An example of a high-temperature-resistant alloy of this type with high creep strength on a nickel basis is Inconel 713 C, which in its essential components is produced from 73% nickel, 13% chromium, 4.2% molybdenum and 2% niobium.

The metallic coating used is preferably an MCrAlX alloy, where M stands for one or more elements of the group comprising iron, cobalt and nickel, Cr stands for chromium, Al stands for aluminum, and X stands for one or more elements of the group comprising yttrium, rhenium and the elements of the rare earths. This metallic coating is applied to the product, in particular the high-temperature component of a gas turbine, in the coating region in a known manner by thermal spraying with the VPS (Vacuum Plasma Spraying) or LPPS (Low Pressure Plasma Spraying) processes. The MCrAlX coatings are especially suitable for high-temperature components in gas turbines having a parent material of a nickel-, or iron- or cobalt-base superalloy. They are suitable in stationary gas turbines and aircraft engines having a high turbine inlet temperature. In addition, they are suitable as an adhesive mediator coating for the application of further coatings in other coating processes, such as, for example, for producing a ceramic heat-insulating coating on a product by means of PVD (Physical Vapor Deposition).

The object which relates to the apparatus is achieved according to the invention by an apparatus for coating a product with a metallic coating in a vacuum plant, comprising a coating chamber and a postheat treatment chamber, the postheat treatment chamber being connected to the coating chamber in a vacuum-tight manner.

This makes it possible for the application of the metallic coating to a product and the subsequent postheat treatment to be carried out in one plant. The vacuum-tight connection between the coating chamber and the postheat treatment chamber ensures that the product is at no time exposed to the atmosphere, in particular the oxygen in the air, during the method. The vacuum plant is therefore superior to conventional plants in which separate vacuum chambers which are not connected to one another in a vacuum-tight manner are provided for the application of the coating and for the postheat treatment.

A heating device is preferably provided in the postheat treatment chamber. The heating device is realized in known configurations, for example by a radiant heating element for indirect radiant heating or by an electron beam gun for heating the product by direct electron bombardment. For the postheat treatment, the process control is to be configured with regard to the temperature of the product in such a way that the product temperature is set at a predetermined value, the postheat treatment temperature. In this case, the postheat treatment temperature is set by measuring the temperature of the product and regulating the heating output of the heating device, for example by regulating the radiation output of a radiant heating element via the heating current.

A preheating chamber is preferably provided, this preheating chamber being arranged upstream of the coating chamber and being connected to the latter in a vacuum-tight manner. The preheating chamber is designed as a vacuum chamber and is an integral part of the entire vacuum plant for coating a product with a metallic coating. Provided in the preheating chamber is a heating device which is designed in a known manner, for example by a radiant heating element for indirect radiant heating or by an electron beam gun for heating the product by direct electron bombardment. The preheating chamber serves, on the one hand, to receive and preheat the product from room temperature to a product temperature and, on the other hand, to pretreat and prepare the product for subsequent method steps, in particular for the application of the metallic coating to the product in the coating chamber. In the preheating chamber, possible impurities which may have entered the surface of the product can also be emitted as gases from the product. Impurities may adversely affect the application of the coating to the product and thus the quality of the coating. Therefore the preheating chamber, in addition to the preliminary process heating, at the same time performs an important cleaning function for the product to be coated, so that, due to the degassing process, a product having an appropriately clean prepared surface and well-defined product temperature is prepared.

A cooling chamber is preferably provided, this cooling chamber being arranged downstream of the postheat treatment chamber and being connected to the latter in a vacuum-tight manner. A product is heated after it has been subjected to the postheat treatment. In order to treat the product further or feed it to its destination, it is brought to room temperature in a suitable manner. To this end, it has to be cooled down, for which purpose, in conventional methods, the external postheat treatment chamber, which is not coupled to a coating chamber, is likewise used. The product is cooled down in a controlled manner in this postheat treatment chamber.

In the vacuum plant, on the other hand, the controlled cooling operation is effected in a separate cooling chamber. In this case, the cooling chamber is designed as a vacuum chamber and is an integral part of the entire vacuum plant. In order to cool the product in a controlled manner, a heating device is provided in the cooling chamber. This heating device ensures that the product is at a predetermined temperature during the cooling operation. As a result, the product is not cooled too rapidly via heat radiation or heat conduction to the surroundings but is cooled virtually steadily by the temperature being reduced down to room temperature gradually and in a controlled manner by regulating the heating output of the heating device.

The heating device is designed, for example, in the form of a known radiant heating element for indirect radiant heating of the product. Additional known treatment devices for cooling the product, for instance in the form of a gas supply system for inert cooling gases (e.g. argon), can be provided in the cooling chamber. In this embodiment, inert cooling gas is admitted in a carefully metered manner to the heated products and the latter are cooled down to room temperature in a controlled manner. The cooling chamber advantageously serves at the same time as a removal chamber for the products.

The vacuum-tight connection between the coating chamber and the postheat treatment chamber is preferably produced via a lock chamber. Both the process times for the application of the metallic coating to the product and for its postheat treatment and the respective process parameters, in particular the coating temperature and the postheat treatment temperature, are different. For example, the application of a metallic coating to a gas turbine blade, in particular a metallic anti-oxidation and anti-corrosion coating, is effected at a coating temperature of about 1100 K to 1200 K. On the other hand, the postheat treatment of the coated gas turbine blade is effected at a markedly higher postheat treatment temperature of 1200 K to 1500 K.

It is therefore expedient to also spatially separate these processes from one another by appropriate devices, here realized by a separate lock chamber, to such an extent that mutual interactions are largely ruled out. This configuration is also favorable in terms of the method. In this case, the lock chamber serves primarily to transfer the products from the coating chamber to the postheat treatment chamber. It is an integral part of the vacuum plant. A heating device is preferably provided in the lock chamber, this heating device ensuring a predetermined product temperature during the transfer.

In this case, the product temperature in the lock chamber can advantageously be continuously adapted to the respective process temperatures during the transfer of the products from the coating chamber into the postheat treatment chamber. Furthermore, when the vacuum plant is used for industrial series production in a simultaneous continuous method, the lock chamber serves as an important buffer system in order to adapt the quantities to one another, if need be, and thus ensure as far as possible a continuous pass of products.

A transfer system is preferably provided for the automatic transfer of the product from a vacuum chamber (preheating chamber, coating chamber, lock chamber, postheat treatment chamber, cooling chamber) into another vacuum chamber of the vacuum plant In particular in a vacuum plant, automatic, preferably electronically controlled, transfer of the products is far superior to other known embodiments, for example with complicated manipulators manually operable externally and with sealed vacuum leadthroughs. In order to permit in particular a continuous and automated pass of the products, the vacuum chambers of the vacuum plant (preheating chamber, coating chamber, lock chamber, postheat treatment chamber, cooling chamber) are equipped with a suitable transfer system. In this case, the transfer system has devices for receiving products, for transporting products and for transferring products, the devices being arranged in the individual vacuum chambers.

The coating chamber preferably has a first receiving capacity and the postheat treatment chamber preferably has a second receiving capacity for products, the second receiving capacity being greater than the first receiving capacity. In general, the (average) number of products in a vacuum chamber is obtained from the number of fed products per unit of time multiplied by the (average) retention time of the products in the vacuum chamber.

In the ideal continuous pass, the number of fed products per unit of time is the same for all vacuum chambers. The (average) number of products in a vacuum chamber is then determined by the retention time in this vacuum chamber. The relative receiving capacities to be planned for products for the coating chamber and for the postheat treatment chamber are then approximately given by the respective process times in these vacuum chambers.

For the application of an MCrAlX coating according to the VPS or LPPS process to a gas turbine blade having a parent material made of a nickel-, iron- or cobalt-base superalloy, a process time of typically about 30 minutes is obtained, whereas the postheat treatment of the gas turbine blade has a process time of about 120 minutes. The postheat treatment chamber is therefore to be dimensioned and configured in such a way that its receiving capacity for gas turbine blades is at least four times as great as the receiving capacity of the coating chamber. The vacuum plant is conceived in such a way that it advantageously permits an adaptation of the receiving capacities to the respective process times and thus a continuous and simultaneous pass of products, a factor which in turn is very favorable for industrial series production.

BRIEF DESCRIPTION OF THE DRAWINGS

The apparatus and the method for coating a product with a metallic coating in a vacuum plant are explained in more detail by way of example with reference to the non-limiting exemplary embodiments discussed in the application and shown in the drawings, in which, in a partly schematic and simplified manner.

DETAILED DESCRIPTION OF THE PREFERRED EMBODIMENTS

Figure 1:
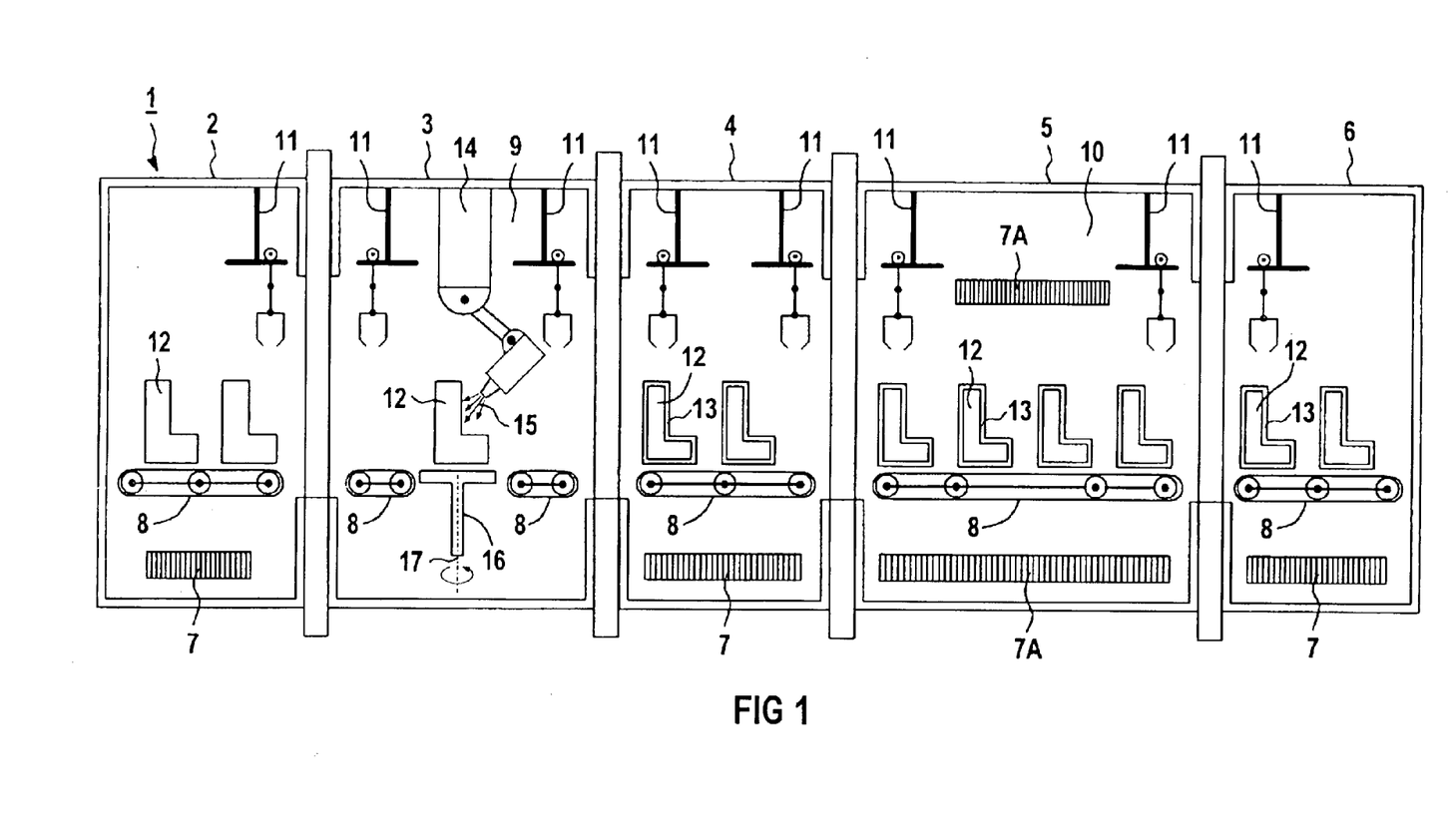
FIG. 1 illustrates a schematic longitudinal section of a vacuum plant for coating products, for example gas turbine blades, with a metallic coating.

A vacuum plant 1 for coating products 12, here gas turbine blades 12 for example, with a metallic coating 13 is shown schematically in FIG. 1 in a longitudinal section. The vacuum plant 1 has various vacuum chambers 2, 3, 4, 5, 6—successively a preheating chamber 2, a coating chamber 3, a lock chamber 4, a postheat treatment chamber 5 and a cooling chamber 6. In this case, the coating chamber 3 is connected in a vacuum-tight manner to the postheat treatment chamber 5 via the lock chamber 4. The preheating chamber 2 is arranged upstream of the coating chamber 3 and is connected to the latter in a vacuum-tight manner. The cooling chamber 6 is arranged downstream of the postheat treatment chamber 5 and is connected to the latter in a vacuum-tight manner.

In each case, at least one heating device 7, 7A is provided in the preheating chamber 2, the lock chamber 4, the postheat treatment chamber 5 and the cooling chamber 6. In the exemplary embodiment shown, the heating devices 7, 7A in the individual vacuum chambers 2, 4, 5, 6 are designed as radiant heating elements for the controlled heating of the gas turbine blades 12 arranged in the vacuum chambers to a predetermined product temperature. Provided in the vacuum chambers 2, 3, 4, 5, 6 is a transfer system 8, 11 which is designed in each case as a delivery/receiving device 11 and transport device 8 in the individual vacuum chambers 2, 3, 4, 5, 6. In each case at least two gas turbine blades 12 are arranged on the respective transport devices 8 in the preheating chamber 2, the lock chamber 4, the postheat treatment chamber 5 and the cooling chamber 6.

The coating chamber 3 has a coating region 9 in which a coating device 14 and a holder 16, rotatable about a longitudinal axis 17, for gas turbine blades 12 are arranged. In this case, the coating device 14 is designed as a VPS (Vacuum Plasma Spraying) or LPPS (Low Pressure Plasma Spraying) device (plasma torch) for the thermal spraying of coating material 15—for example MCrAlX—onto a gas turbine blade 12. The coating device 14 at the same time serves to heat the gas turbine blade 12 to a predetermined product temperature. This is ensured during a coating operation by the hot process gases of the coating device 14 (plasma torch) and by the coating material 15 striking the gas turbine blade 12.

A gas turbine blade 12 is located in the coating region 9 on the holder 16. The coating device 14 is arranged above the gas turbine blade 12 in the coating region 9. Formed in the postheat treatment chamber 5 is a postheat treatment region 10, in which a number of coated gas turbine blades 12 having a metallic coating 13, in particular an MCrAlX coating, are located on the transport device 8. In this case, the number of gas turbine blades 12 in the postheat treatment region 10 is greater than the number of gas turbine blades 12 in the coating region 9.

Two heating devices 7A are provided in the postheat treatment region 10. One heating device 7A is arranged above and the other heating device 7A is arranged below the gas turbine blades 12, so that heating of the gas turbine blades 12 to a predetermined product temperature (which is the postheat treatment temperature) is thereby ensured by heat radiation. The vacuum chambers 2, 3, 4, 5, 6 of the vacuum plant 1 are connected to a vacuum pump system (not shown in FIG. 1), which preferably consists of a diffusion pump, valves and vacuum measuring devices and also a backing pump, so that a respectively required vacuum can be set in the individual vacuum chambers 2, 3, 4, 5, 6.

In the coating method for coating a product 12, for example a gas turbine blade 12, with a metallic coating 13, a metallic MCrAlX anti-oxidation coating, in a vacuum plant 1, a gas turbine blade 12 is first of all fed into the preheating chamber 2 and arranged on the transport device 8 of the transfer system 8, 11. The preheating chamber 2 serves to receive and preheat the gas turbine blade 12. With the heating device 7 provided in the preheating chamber 2, the gas turbine blade 12 is heated from room temperature to a product temperature which is the coating temperature.

The gas turbine blade 12 is pretreated in the preheating chamber 2 and prepared for subsequent method steps, in particular for the application of the metallic coating 13 to the gas turbine blade 12 in the coating chamber 3. In the preheating chamber 2, possible impurities which may have entered the surface of the gas turbine blade 12 can also be emitted as gases from the gas turbine blade 12. Therefore the preheating chamber 2, in addition to the preliminary process heating, at the same time performs an important cleaning function for the gas turbine blade 12 to be coated.

After the heating and degassing process, a gas turbine blade 12 having an appropriately clean prepared surface and well-defined product temperature which is the coating temperature is prepared here. The gas turbine blade 12 is then automatically transferred by the transfer system 8, 11 from the preheating chamber 2 into the coating region 9 of the coating chamber 3 and arranged on a movable holder 16, here rotatable about a longitudinal axis 17.

In the coating chamber 3, during the coating operation, a metallic coating 13, for example an MCrAlX anti-oxidation coating, is applied to the gas turbine blade 12. The coating material 15 (MCrAlX), for example by thermal spraying with VPS or LPPS spraying methods, is applied to the surface of the gas turbine blade 12 moving about the longitudinal axis 17, in this case rotating about the longitudinal axis 17.

In this case, the process time for applying this coating 13 is about 30 min. During this period, the gas turbine blade 12 is held at a coating temperature of around 1100 K to about 1200 K by the process-related heat input into the gas turbine blade 12. In this exemplary case, the gas turbine blade 12 is heated by the hot process gases of the coating device 14 (plasma torch) and by the coating material 15 striking the gas turbine blade 12.

After the metallic coating 13 has been applied to the gas turbine blade 12, the latter is automatically transferred by the transfer system 8, 11 from the coating region 9 into the postheat treatment region 10. This transfer is effected via the lock chamber 4.

In the lock chamber 4, the gas turbine blade 12, by means of the heating device 7 arranged there, is held at a predetermined product temperature which is always higher than a minimum temperature. The minimum temperature in this case is higher than room temperature and is preferably 500 K, in particular between about 900 K and about 1400 K.

After the transfer, the gas turbine blade 12 provided with a metallic coating 13 is subjected to a postheat treatment in the postheat treatment region 10, this postheat treatment taking place at a postheat treatment temperature of about 1200 K to 1500 K. To this end, the gas turbine blade 12 is brought to the predetermined postheat treatment temperature by means of the heating devices 7A and is held at this postheat treatment temperature for a period of time. Here, the process time is, for example, 120 min (also see descriptions with respect to FIG. 2 and FIG. 3). As a result, firm bonding (diffusion bonding) between the metallic coating 13 and the parent material of the gas turbine blade 12 is produced.

After the postheat treatment, the gas turbine blade 12 is automatically transferred from the postheat treatment chamber 5 into the cooling chamber 6. A gas turbine blade 12 is heated after it has been subjected to the postheat treatment. In order to treat the gas turbine blade 12 further or feed it to its destination, it is brought to room temperature in a suitable manner. To this end, it has to be cooled down.

In conventional methods, this is likewise carried out in the external postheat treatment chamber, which does not have a vacuum coupling to the coating chamber. In the vacuum plant, on the other hand, the controlled cooling operation is effected in the separate cooling chamber 6. In order to cool the gas turbine blade 12 in a controlled manner, a heating device 7 is provided in the cooling chamber 6. This heating device 7 ensures that the gas turbine blade 12 is at a predetermined temperature during the cooling operation. As a result, the gas turbine blade 12 is not cooled too rapidly via heat radiation or heat conduction to the surroundings, but is cooled virtually steadily by the temperature being reduced down to room temperature gradually and in a controlled manner by controlling or regulating the heating output of the heating device 7. Once the gas turbine blade 12 has been cooled down to room temperature in a controlled manner in the cooling chamber 6, it is removed from the cooling chamber 6.

The method, just described by way of example for a product 12, in particular a gas turbine blade 12, for coating a product 12 with a metallic coating 13 is characterized by the fact that it is conceived as a continuous and simultaneous method. In this way, a plurality of products 12 can pass through various method steps simultaneously and continuously. In FIG. 1, this is illustrated by the fact that, for example, one gas turbine blade 12 is located in the coating region 9 and simultaneously, a larger number of gas turbine blades 12 is in each case located in the preheating chamber 2, the lock chamber 4, the postheat treatment chamber 10 and the cooling chamber 6. A metallic coating 13 is therefore applied to gas turbine blades 12 in the coating region 9, while gas turbine blades 12 provided with a metallic coating 13 are simultaneously subjected to a postheat treatment in the postheat treatment region 10; and at the same time gas turbine blades 12 are pretreated in the preheating chamber 2, and at the same time gas turbine blades 12 are cooled down in a controlled manner in the cooling chamber 6, and at the same time gas turbine blades 12 are transferred in the lock chamber 4. A continuous and simultaneous pass of gas turbine blades 12 through the various method steps is possible.

In particular, in this continuous method, the pass of gas turbine blades 12 per unit of time is markedly increased compared with non-simultaneous and/or discontinuous methods. In the method, due to the different process times of the individual method steps, more gas turbine blades 12 are subjected to a postheat treatment than are coated at the same time in the coating region 9, since the postheat treatment process generally constitutes the limiting process with respect to time. By designing the vacuum plant 1 with due regard to the respective process times, a continuous and simultaneous pass of products 12 is ensured, and efficient production of metallic coatings 13 on products 12 is made possible. In this case, the method, in addition to the coating of gas turbine blades 12, is also suitable for coating other high-temperature components of a gas turbine, for example for heat shield elements of a combustion chamber.

In the following figures, the process control with regard to the temperature profile according to a conventional method (FIG. 2) and according to the method according to the invention (FIG. 3) are compared with one another and explained in more detail. Reference is occasionally made here to the reference numerals in FIG. 1 for the purpose of clarification.

Figure 2:
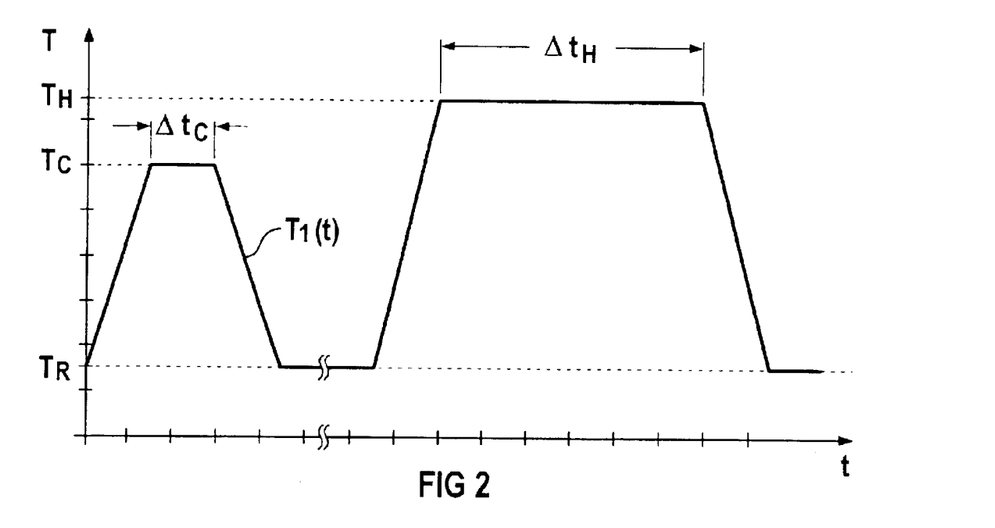
FIG. 2 is a diagram with a simplified temperature profile for a product according to a conventional method.

FIG. 2 shows a diagram in which the temperature is plotted against time for a product 12, in particular for a gas turbine blade, according to a conventional coating method. The time t is plotted on the X-axis of the diagram, and the temperature T of the product 12 at a certain time t during the method is plotted on the Y-axis. The product temperature T as a function of the time t is shown in the diagram as curve trace $T_1(t)$.

The product 12 is first of all heated linearly from room temperature $T_R$ to a product temperature T which is the coating temperature $T_C$. While the metallic coating 13 is being applied to the product 12, the temperature for the coating process time $\Delta t_C$ is kept at the coating temperature $T_C$. The product 12 is then cooled down from the coating temperature $T_C$ to room temperature $T_R$.

The product 12 is then normally removed from the coating chamber 3, put into intermediate storage in a suitable manner, and fed at an unspecified point in time to a postheat treatment chamber 5 for postheat treatment. The postheat treatment of the product 12 therefore does not take place directly after the application of the metallic coating 13.

In order to illustrate this, the time axis t in FIG. 2 is interrupted after the cooling to room temperature $T_R$ and before the start of the postheat treatment. This is therefore not a continuous method. The product 12 is eventually subjected to a postheat treatment. To this end, the product 12 is first of all heated from room temperature $T_R$ (linearly) to a product temperature T which is the postheat treatment temperature $T_H$. The latter is higher than the coating temperature $T_C$. Since the postheat treatment generally has a longer process time than the application of the metallic coating 13, the postheat treatment process time $\Delta t_H$ during which the product is at the postheat treatment temperature $T_H$ is accordingly greater than the coating process time $\Delta t_C$.

For example, for a postheat treatment of products 12 which constitute gas turbine blades, the postheat treatment process time $\Delta t_H$ is about four times as great as the coating if process time $\Delta t_C$. After the postheat treatment, the product 12 is cooled down again from the postheat treatment temperature $T_H$ to room temperature $T_R$. The process control with regard to the temperature profile in a conventional method is characterized by the fact that the product 12 is cooled down to room temperature $T_R$ between the application of the metallic coating 13 and the postheat treatment.

Figure 3:
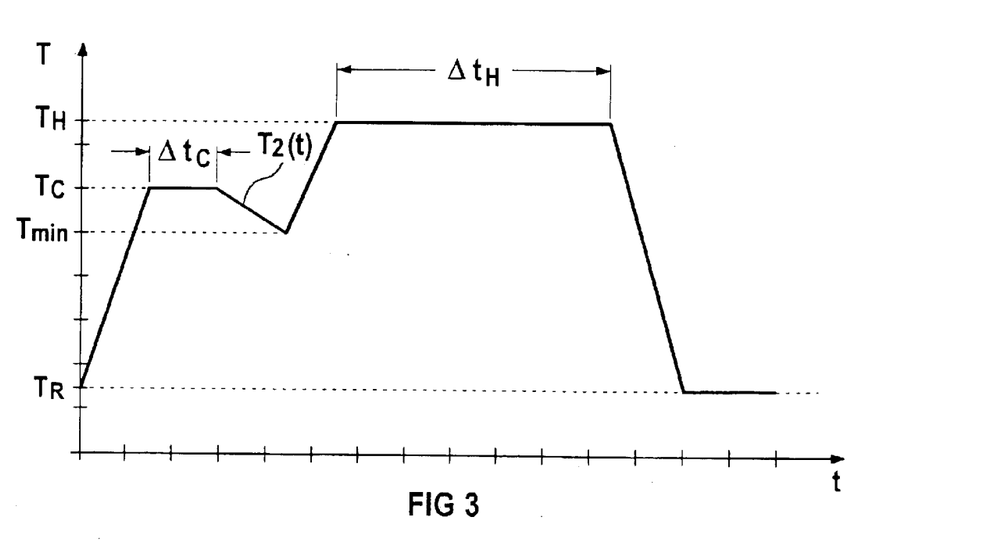
FIG. 3 is a diagram with a simplified temperature profile for a product according to the method according to the invention.

A diagram having a temperature profile for a product 12, in particular for a gas turbine blade, according to the method according to the invention is shown in FIG. 3. The time t is plotted on the X-axis of the diagram, whereas the product temperature T of the product 12 at a certain time t is plotted on the Y-axis of the diagram. The product temperature T as a function of the time t is illustrated in the diagram by the corresponding curve trace $T_2(t)$.

With this temperature profile, the product 12 is first of all heated linearly from room temperature $T_R$ to a product temperature T which is the coating temperature $T_c$. While the metallic coating 13 is being applied to the product 12, the temperature for the coating process time $\Delta t_C$ is kept at the coating temperature $T_c$. For products 12 which constitute, for example, gas turbine blades which are provided with an MCrAlX coating, the coating temperature $T_c$ is 1100 K to about 1200 K.

Directly after the actual coating operation, the product 12 is transferred continuously from the coating region 9 into the postheat treatment region 10 through the lock chamber 4, which, as illustrated, is possibly associated with a change in the temperature of the product 12, generally with a decrease in the temperature. The temperature profile in this method step is constructed in such a way that the possible temperature decrease of the product 12 from the coating temperature $T_H$ to a minimum temperature $T_{min}$ is restricted, this minimum temperature $T_{min}$ being higher than room temperature $T_R$. In gas turbine blades, the minimum temperature $T_{min}$ in this case is preferably higher than 500 K, in particular between about 900 K and 1400 K.

The product 12, for the postheat treatment, is then heated to a product temperature T which is the postheat treatment temperature $T_H$ and which, for example for gas turbine blades, in around 1200 K to 1500 K. The postheat treatment takes place at the postheat treatment temperature $T_H$, at which the product 12 is held for a postheat treatment process time $\Delta t_H$ is greater than the coating process time $\Delta t_C$.

After the postheat treatment, the product 12 is cooled down from the postheat treatment temperature $T_H$ to room temperature $T_R$. The time-dependent temperature profile of the product 12 according to this method has a continuous curve trace $T_2(t)$ which, in particular, connects the plateau region having the coating temperature $T_C$ and the following plateau region having the postheat treatment temperature $T_H$ in a controlled manner and continuously to one another. The connection is effected in this case in such a way that, at all times, a minimum temperature $T_{min}$ of the product 12 is ensured, in which case the product 12 is definitely not cooled down to room temperature $T_R$ and/or is definitely not exposed to the atmosphere.

This novel process control with regard to the temperature profile makes it possible to markedly improve the bonding of the metallic coating 13 on the parent material of the product 12 during the postheat treatment. The product 12 in this case is always close to a state of thermodynamic equilibrium with its surroundings. Time and spatial temperature gradients, in particular harmful thermal shocks as a result of cooling to room temperature $T_R$, are avoided, which has a very advantageous effect on the quality of the metallic coating.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of coating a product with a metallic anti-oxidation coating in one single vacuum plant, the plant including a coating chamber and a postheat treatment chamber separated from the coating chamber, wherein the postheat treatment chamber is connected to the coating chamber in a vacuum-tight manner, the method comprising:

heating the product brought into the coating chamber and subjected to a vacuum from room temperature to a product temperature;

applying the metallic anti-oxidation coating to the product being in a vacuum;

transferring the coated product from the coating chamber to the postheat treatment chamber by a transfer system without interruption of the vacuum;

subjecting the coated product to a postheat treatment in the postheat treatment chamber in a vacuum, wherein the postheat treatment follows the application of the coating in such a way that the temperature of the product, after the application of the coating and before the postheat treatment, is at least equal to a minimum temperature, the minimum temperature being higher than room temperatures; and transferring the coated product from the vacuum plant.

2. The method as claimed in claim 1, wherein the minimum temperature is about 500 K.

3. The method as claimed in claim 1, wherein the product is automatically transferred from the coating chamber into the postheat treatment chamber.

4. The method as claimed in claim 1, further comprising:

cooling down the product subjected to postheat treatment, to room temperature in a controlled manner.

5. The method as claimed in claim 4, wherein the metallic anti-oxidation coating is an MCrAlX alloy, where M stands for one or more elements of the group including iron, cobalt and nickel; Cr stands for chromium; Al stands for aluminum; and X stands for one or more elements of the group including yttrium, rhenium and the elements of the rare earths.

6. The method as claimed in claim 1, wherein a first number of products is located in the coating chamber and simultaneously, a second number of products is located in the postheat treatment chamber, the second number being larger than the first number.

7. The method as claimed in claim 1, wherein a material used for the product is one of a nickel-, iron-, or cobalt-base superalloy.

8. The method as claimed in claim 7, wherein the metallic anti-oxidation coating is an MCrAlX alloy, where M stands for one or more elements of the group including iron, cobalt and nickel; Cr stands for chromium; Al stands for aluminum; and X stands for one or more elements of the group including yttrium, rhenium and the elements of the rare earths.

9. The method as claimed in claim 1, wherein the metallic anti-oxidation coating is an MCrAlX alloy, where M stands for one or more elements of the group including iron, cobalt and nickel; Cr stands for chromium; Al stands for aluminum; and X stands for one or more elements of the group including yttrium, rhenium and the elements of the rare earths.

10. The method of claim 1, wherein the minimum temperature ranges from about 900 K to about 1400 K.

11. A method of coating a product with a metallic anti-oxidation coating in one single vacuum plant, the plant including a coating chamber, a postheat treatment chamber, and a lock chamber connecting the coating chamber and the postheat treatment chamber, the method comprising:

heating the product, brought into the coating chamber and subjected to a vacuum, from room temperature to a product temperature;

applying the metallic anti-oxidation coating to the product;

transferring the coated product from the coating chamber to the lock chamber by a transfer system, wherein a temperature of the product, after coating and before postheat treatment, is at least equal to a minimum temperature which is higher than room temperature;

transferring the coated product from the lock chamber to the postheat treatment chamber by a transfer system;

subjecting the coated product to a postheat treatment being in a vacuum; and transferring the coated product from the vacuum plant.

12. A method of coating a product with a metallic anti-oxidation coating in one single vacuum plant having a coating chamber and a postheat treatment chamber separated from the coating chamber, wherein the postheat treatment chamber is connected to the coating chamber in a vacuum-tight manner, the method comprising:

heating the product brought into the coating chamber and subjected to a vacuum from room temperature to a product temperature and applying the metallic anti-oxidation coating to the product being in a vacuum;

transferring the coated product from the coating chamber to a postheat treatment chamber by a transfer system without interruption of the vacuum;

subjecting the coated product to a postheat treatment in the postheat treatment chamber in a vacuum, using a heating device, enabling a different temperature compared to the temperature of the coating chamber, wherein the postheat treatment follows the application of the coating in such a way that the temperature of the product, after the application of the coating and before the postheat treatment, is at least equal to a minimum temperature, the minimum temperature being higher than room temperature; and transferring the coated product from the vacuum plant.

13. A method of coating a product with a metallic anti-oxidation coating in one single vacuum plant, the plant including a coating chamber and a postheat treatment chamber separated from the coating chamber, wherein the postheat treatment chamber is connected to the coating chamber in a vacuum-tight manner, the method comprising:

heating the product brought into the coating chamber and subjected to a vacuum from room temperature to a product temperature and applying the metallic anti-oxidation coating to the product being in a vacuum;

transferring the coated product from the coating chamber to the postheat treatment chamber by a transfer system without interruption of the vacuum;

subjecting the coated product to a postheat treatment in the postheat treatment chamber in a vacuum and simultaneously heating and coating a new number of products in the coating chamber, wherein the postheat treatment follows the application of the coating in such a way that the temperature of the product, after the application of the coating and before the postheat treatment, is at least equal to a minimum temperature, the minimum temperature being higher than room temperature; and transferring the coated product from the vacuum plant.

14. An apparatus for coating a product with a metallic anti-oxidation coating in one single vacuum plant, comprising:

a coating chamber;

a postheat treatment chamber separated from the coating chamber, wherein the postheat treatment chamber is connected to the coating chamber in a vacuum-tight manner, wherein both chambers are maintained in vacuum such that the product is not exposed to the atmosphere from a time of entry into the vacuum plant until a time of exit from the vacuum plant, and wherein the postheat treatment chamber is connected to the coating chamber such that the product is transferable by a transfer system from the coating chamber to the postheat treatment chamber without interruption of the vacuum.

15. The apparatus as claimed in claim 14, wherein a heating device is provided in the postheat treatment chamber.

16. The apparatus as claimed in claim 14, further comprising:

a preheating chamber, the preheating chamber being arranged upstream of the coating chamber and being connected to the coating chamber in a vacuum-tight manner.

17. The apparatus as claimed in claim 16, further comprising:
a cooling chamber, the cooling chamber being arranged downstream of the postheat treatment chamber and being connected to the postheat treatment chamber in a vacuum-tight manner.

18. The apparatus as claimed in claim 16, wherein the vacuum-tight connection between the coating chamber and the postheat treatment chamber is produced via a lock chamber.

19. The apparatus as claimed in claim 18, wherein a heating device is provided in the lock chamber.

20. The apparatus as claimed in claim 16, wherein the vacuum-tight connection between the coating chamber and the preheating chamber is produced via a lock chamber.

21. The apparatus as claimed in claim 20, wherein a heating device is provided in the lock chamber.

22. The apparatus as claimed in claim 14, further comprising:
a cooling chamber, the cooling chamber being arranged downstream of the postheat treatment chamber and being connected to the postheat treatment chamber in a vacuum-tight manner.

23. The apparatus as claimed in claim 22, wherein the vacuum-tight connection between the coating chamber and the postheat treatment chamber is produced via a lock chamber.

24. The apparatus as claimed in claim 23, wherein a heating device is provided in the lock chamber.

25. The apparatus as claimed in claim 14, wherein the connection between the coating chamber and the postheat treatment chamber is produced via a lock chamber.

26. The apparatus as claimed in claim 25, wherein a heating device is provided in the lock chamber.

27. The apparatus as claimed in claim 14, further comprising:
a transfer system for the automatic transfer of the product from one chamber into another chamber of the vacuum plant.

28. The apparatus as claimed in claim 14, wherein the coating chamber includes a first receiving capacity for products and the postheat treatment chamber includes a second receiving capacity for products, the second receiving capacity being greater than the first receiving capacity.

29. A vacuum plant, comprising:
a coating chamber, wherein a product is adapted to be coated with a metallic anti-oxidation coating while in a vacuum;
a postheat treatment chamber, wherein the coated product is adapted to be subjected to postheat treatment while in a vacuum;
a lock chamber, which produces a vacuum-tight connection between the coating chamber and the postheat treatment chamber, wherein the lock chamber separates the postheat treatment chamber from the coating chamber, and wherein a temperature of the product after coating and before postheat treatment is at least equal to a minimum temperature which is higher than room temperature; and
a plurality of transfer systems respectively provided in each of the coating chamber, the postheat treatment chamber, and the lock chamber, which transfers the product from one chamber to another without interruption of the vacuum.

30. The vacuum plant of claim 29, wherein the minimum temperature is about 500 K.

31. The vacuum plant of claim 29, wherein the minimum temperature ranges from about 900K to about 1400 K.

32. The vacuum plant of claim 29, further comprising:
a preheating chamber, the preheating chamber being arranged upstream of the coating chamber and being connected to the coating chamber in a vacuum-tight manner.

33. The vacuum plant of claim 32, further comprising:
a cooling chamber, the cooling chamber being arranged downstream of the postheat treatment chamber and being connected to the postheat treatment chamber in a vacuum-tight manner.

34. The vacuum plant of claim 32, wherein the transfer systems automatically transfer the product from one chamber into another chamber of the vacuum plant.

35. The vacuum plant of claim 29, further comprising:
a cooling chamber, the cooling chamber being arranged downstream of the postheat treatment chamber and being connected to the postheat treatment chamber in a vacuum-tight manner.

36. The vacuum plant of claim 35, wherein the transfer systems automatically transfer of the product from one chamber into another chamber of the vacuum plant.

37. The vacuum plant of claim 29, wherein the transfer systems automatically transfer the product from one chamber into another chamber of the vacuum plant.

38. A vacuum plant, comprising:
a coating chamber, wherein a product is adapted to be coated with a metallic anti-oxidation coating while in a vacuum;
a postheat treatment chamber with a second heating device, wherein the coated product is adapted to be subjected to heat treatment while in a vacuum;
wherein the postheat treatment chamber is separated from the coating chamber through a lock chamber with a first heating device;
wherein the first heating device is separately controllable from the second heating device;
wherein the lock chamber produces a vacuum-tight connection between the coating chamber and the postheat treatment chamber;
wherein a temperature of the product after coating and before postheat treatment is at least equal to a minimum temperature which is higher than room temperature; and
a plurality of transfer systems respectively provided in each of the coating chamber, the postheat treatment chamber, and the lock chamber, which transfers the product from one chamber to another without interruption of the vacuum.

* * * * *